(12) United States Patent
Ahn et al.

(10) Patent No.: US 9,915,782 B2
(45) Date of Patent: Mar. 13, 2018

(54) OPTICAL INTERCONNECTION DEVICE AND INTEGRATED OPTICAL DEVICE USING BULK-SILICON SUBSTRATE

(71) Applicant: KOOKMIN UNIVERSITY INDUSTRY-ACADEMIC COOPERATION FOUNDATION, Seoul (KR)

(72) Inventors: Donghwan Ahn, Yongin-si (KR); Yoonyoung Bae, Seoul (KR)

(73) Assignee: KOOKMIN UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/355,293

(22) Filed: Nov. 18, 2016

(65) Prior Publication Data

US 2018/0039022 A1    Feb. 8, 2018

(30) Foreign Application Priority Data

Aug. 4, 2016    (KR) .................. 10-2016-0099460

(51) Int. Cl.
| | |
|---|---|
| *G02B 6/12* | (2006.01) |
| *G02B 6/14* | (2006.01) |
| *G02B 6/122* | (2006.01) |
| *G02F 1/025* | (2006.01) |
| *G02F 1/015* | (2006.01) |

(52) U.S. Cl.
CPC ............. *G02B 6/14* (2013.01); *G02B 6/1228* (2013.01); *G02F 1/025* (2013.01); *G02B 2006/12061* (2013.01); *G02B 2006/12152* (2013.01); *G02F 2001/0151* (2013.01)

(58) Field of Classification Search
CPC . G02B 6/14; G02B 6/305; G02B 2006/12152
See application file for complete search history.

(56) References Cited

U.S. PATENT DOCUMENTS

| | | | | |
|---|---|---|---|---|
| 6,690,871 B2 * | 2/2004 | Lee | ........................ | G02B 6/10 385/124 |
| 6,819,853 B2 * | 11/2004 | Lam | ................... | G02B 6/12002 385/131 |
| 7,643,710 B1 * | 1/2010 | Liu | ........................ | B82Y 20/00 385/129 |
| 8,160,404 B2 | 4/2012 | Pan et al. | | |

(Continued)

*Primary Examiner* — Rhonda Peace
(74) *Attorney, Agent, or Firm* — Sughrue Mion, PLLC (57) ABSTRACT

An optical interconnection device including: a first element layer formed on a substrate; a second element layer disposed on the first element layer and receiving an optical signal; and a mode converter interposed between the first element layer and the second element layer, and eliminating a difference between an effective refractive index of the first element layer and an effective refractive index of the second element layer and match a mode profile, wherein the first element layer, the mode converter, and the second element layer are sequentially disposed on respective planes spaced apart from each other on the substrate, and one end of the mode converter overlaps a part of the second element layer, and the other end of the mode converter overlaps a part of the first element layer.

12 Claims, 6 Drawing Sheets

(56) References Cited

U.S. PATENT DOCUMENTS

| | | | | |
|---|---|---|---|---|
| 8,254,737 B2* | 8/2012 | Choudhury | .......... | G02B 6/1228 |
| | | | | 385/146 |
| 8,615,148 B2* | 12/2013 | Chen | .................. | G02B 6/1228 |
| | | | | 385/43 |
| 8,787,712 B2* | 7/2014 | Grondin | ................. | B82Y 20/00 |
| | | | | 385/14 |
| 8,842,942 B2* | 9/2014 | Shin | ..................... | G02F 1/2257 |
| | | | | 385/3 |
| 9,128,240 B2* | 9/2015 | Hatori | ..................... | G02B 6/12 |
| 9,316,792 B2* | 4/2016 | Park | ....................... | G02B 6/305 |
| 9,563,018 B2* | 2/2017 | Budd | .................. | G02B 6/1228 |
| 9,618,699 B2* | 4/2017 | Tummidi | ................ | G02B 6/30 |
| 9,703,047 B2* | 7/2017 | Painchaud | ............ | G02B 6/305 |
| 9,715,072 B2* | 7/2017 | Labeye | ................ | G02B 6/4291 |
| 2004/0037497 A1* | 2/2004 | Lee | ..................... | G02B 6/1228 |
| | | | | 385/28 |
| 2011/0194803 A1* | 8/2011 | Shin | ..................... | G02F 1/2257 |
| | | | | 385/3 |
| 2012/0141069 A1* | 6/2012 | Ming-Chang | ........ | G02B 6/1228 |
| | | | | 385/43 |
| 2013/0156370 A1* | 6/2013 | Kim | ..................... | G02B 6/305 |
| | | | | 385/14 |
| 2014/0294341 A1* | 10/2014 | Hatori | ..................... | G02B 6/12 |
| | | | | 385/14 |
| 2017/0123160 A1* | 5/2017 | Kato | ..................... | G02B 6/305 |

\* cited by examiner

OPTICAL INTERCONNECTION DEVICE AND INTEGRATED OPTICAL DEVICE USING BULK-SILICON SUBSTRATE

CROSS REFERENCE TO RELATED APPLICATIONS

This application claims priority from Korean Patent Application No. 10-2016-0099460, filed on Aug. 4, 2016, in the Korean Intellectual Property Office, the contents of which are incorporated herein by reference in their entireties.

BACKGROUND

1. Field

One or more embodiments relate to optical interconnection devices and integrated optical devices, and more particularly, to integrated optical devices and optical interconnection devices manufactured on a bulk-silicon (Si) substrate by using germanium (Ge) or silicon-germanium (SiGe) materials having a higher refractive index than that of Si.

2. Description of the Related Art

Most optical elements have formed separate systems by being connected to each other separately via optical fiber cables. Such the method is unfavorable for mass production resulting in cost reduction in the same manner as electric elements that are invented before integrated circuits are invented. Therefore, integrated optical devices similar to electric integrated circuit devices are studied recently. The integrated optical devices include optical elements and electric elements integrated and miniaturized on a single substrate with various functions, in the same manner as the electric integrated circuit devices.

Optical elements included in the integrated optical devices may be roughly divided into active optical elements and passive optical elements. The active optical elements, to which power is supplied, may be, e.g., light sources, modulators, or receivers, and the passive optical elements, to which power is not supplied, may be, e.g., waveguides, couplers, filters, or multiplexers.

For example, the modulators may be divided into an interferometer type and a resonance type. Interferometer type modulators have advantages of high-speed operations and a broadband spectrum, and are independent of a temperature change. However, the interferometer type modulators are difficult to miniaturize due to a length of several millimeters. Resonance type modulators may have a length of several tens of micrometers. However, the resonance type modulators have a narrow-band spectrum and are dependent of a temperature change.

Furthermore, a silicon on insulator (SOI) substrate is mainly used in existing main techniques manufacturing modulators and receivers in a Si-compatible substrate structure. A waveguide, which is a basic structure of optical devices, may include a core part having a higher refractive index and a cladding material part surrounding the core material part and having a lower refractive index. Therefore, when a silicon-core waveguide is manufactured by using the SOI substrate, the process may be simplified because buried oxide in the SOI substrate functions as a lower cladding, and furthermore, low optical loss may be expected from characteristics of single-crystal silicon that is an upper silicon layer of the SOI substrate. However, the SOI substrate is about ten times as expensive as a bulk-Si substrate, and thus, is unfavorable for cost reduction. Therefore, it may be advantageous to develop an optical element based on a low-cost bulk-Si substrate.

SUMMARY

One or more embodiments include an optical interconnection device and an integrated optical device based on a bulk-silicon (Si) substrate. However, this is merely an example, and embodiments of the disclosure are not limited thereto.

Additional aspects will be set forth in part in the description which follows and, in part, will be apparent from the description, or may be learned by practice of the presented embodiments.

According to an aspect of the inventive concept, there is provided an optical interconnection device, comprising: a first element layer formed on a substrate; a second element layer disposed on the first element layer and receiving an optical signal; and a mode converter interposed between the first element layer and the second element layer, and eliminating a difference between an effective refractive index of the first element layer and an effective refractive index of the second element layer and match a mode profile, wherein the first element layer, the mode converter, and the second element layer are sequentially disposed on respective planes spaced apart from each other on the substrate, and one end of the mode converter overlaps a part of the second element layer, and the other end of the mode converter overlaps a part of the first element layer.

According to an exemplary embodiment, wherein the substrate may be a bulk substrate comprising a material having a first refractive index, and the first element layer may comprise a material having a second refractive index, the mode converter may comprise a material having a third refractive index, and the second element layer may comprise a material having a fourth refractive index, wherein a first effective refractive index of the first element layer in a waveguide mode may be approximately the same as an effective refractive index of the other end of the mode converter in a waveguide mode, and the second effective refractive index of the second element layer in a waveguide mode may be approximately the same as an effective refractive index of the one end of the mode converter in a waveguide mode, and the first effective refractive index may be greater than the first refractive index and less than the second refractive index, and the second effective refractive index may be less than the third and fourth refractive indexes.

According to an exemplary embodiment, wherein a material having the first refractive index may be silicon (Si), a material having the second refractive index may be germanium (Ge) or silicon germanium (SiGe), a material having the third refractive index may be Ge, SiGe, or Si, and a material having the fourth refractive index may be Si, silicon oxide (SiOx), silicon nitride (SiNx), silicon oxynitride (SiON), or a combination thereof.

According to an exemplary embodiment, wherein a width of the one end of the mode converter may be different from a width of the other end of the mode converter.

According to an exemplary embodiment, wherein the width of the one end of the mode converter may be less than the width of the other end of the mode converter.

According to an exemplary embodiment, wherein the mode converter may further comprise a tapered region connecting the one end with the other end.

According to an exemplary embodiment, wherein a gap between the one end of the mode converter and the second element layer may be different from a gap between the other end of the mode converter and the first element layer.

According to an exemplary embodiment, wherein the gap between the one end of the mode converter and the second element layer may be greater than the gap between the other end of the mode converter and the first element layer.

According to an exemplary embodiment, the optical interconnection device may further comprise an insulating layer filling spaces between the substrate, the first element layer, the second element layer, and the mode converter.

According to another aspect of the inventive concept, there is provided an integrated optical device, comprising: a bulk-silicon (Si) substrate; a first element layer formed on the bulk-Si substrate and configuring an active optical element; a second element layer disposed on the first element layer and to which an optical signal is transmitted; and a mode converter interposed between the first and second element layers, and eliminating a difference between an effective refractive index of the first element layer and an effective refractive index of the second element layer and match a mode profile, wherein the first element layer, the mode converter, and the second element layer are sequentially disposed on respective planes on the substrate, in which the planes are spaced apart from one another, and one end of the mode converter overlaps a part of the second element layer, and the other end of the mode converter overlaps a part of the first element layer.

According to still another aspect of the inventive concept, there is provided an active optical element, comprising: a bulk substrate, which is different from an SOI substrate, comprising a material having a first refractive index; and a first element layer, which is formed on the bulk substrate, comprising a material having a second refractive index that is greater than the first refractive index and implementing a waveguide structure confining an optical signal.

According to an exemplary embodiment, wherein the active optical element may be an optical modulator, a photodetector, or a light-emitting element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Sizes of elements in the drawings may be exaggerated for convenience of explanation. Like reference numerals refer to like elements throughout. It will be understood that when an element is referred to as being "on" another element, it may be directly on the other element, or intervening elements may be present. As used herein, the term "and/or" includes any and all combinations of one or more of the associated listed items.

An effective refractive index (neff) in a mode penetrating through a waveguide is as below. The effective refractive index may be less than a refractive index of a core material forming the waveguide and may be greater than that of a cladding material. In other words, an effective refractive index of the mode penetrating through a waveguide may be between a refractive index of a core material forming the waveguide and a refractive index of a cladding material. If the condition is not satisfied, the mode may not penetrate through the waveguide or may be optically damaged when penetrating through the waveguide.

Figure 1:
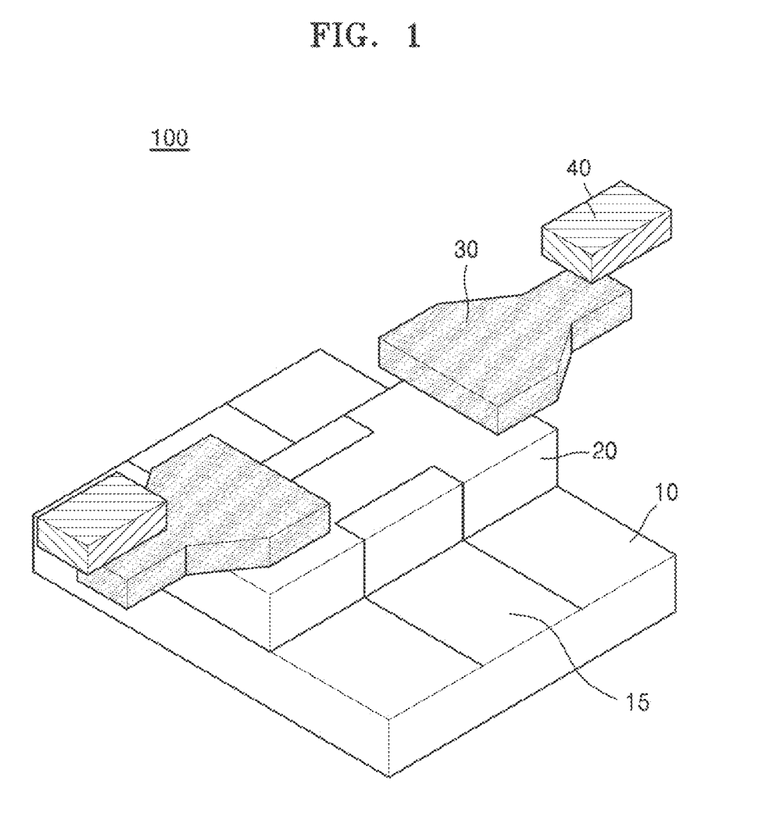
FIG. 1 is a schematic perspective view of a part of an optical interconnection device and an integrated optical device, according to an embodiment of the inventive concept.
Figure 2:
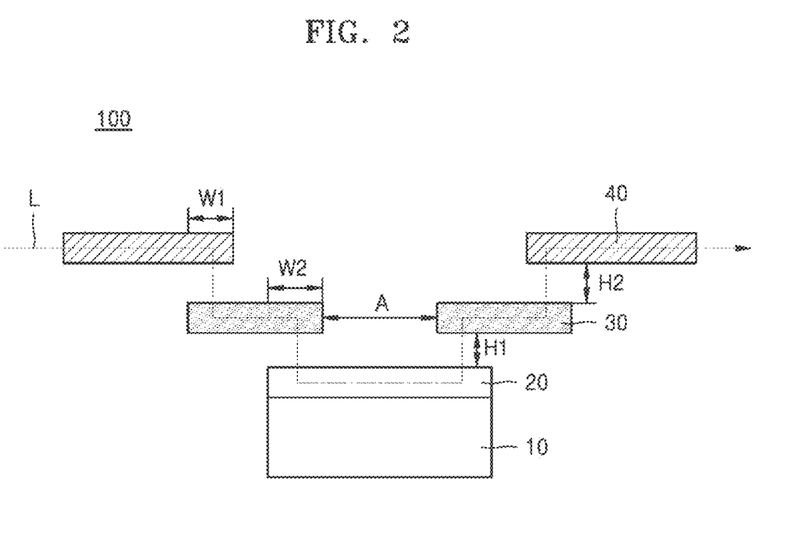
FIG. 2 is a schematic view of a route through which light is guided in an optical interconnection device and an integrated optical device, according to an embodiment of the inventive concept.
Figure 3A:
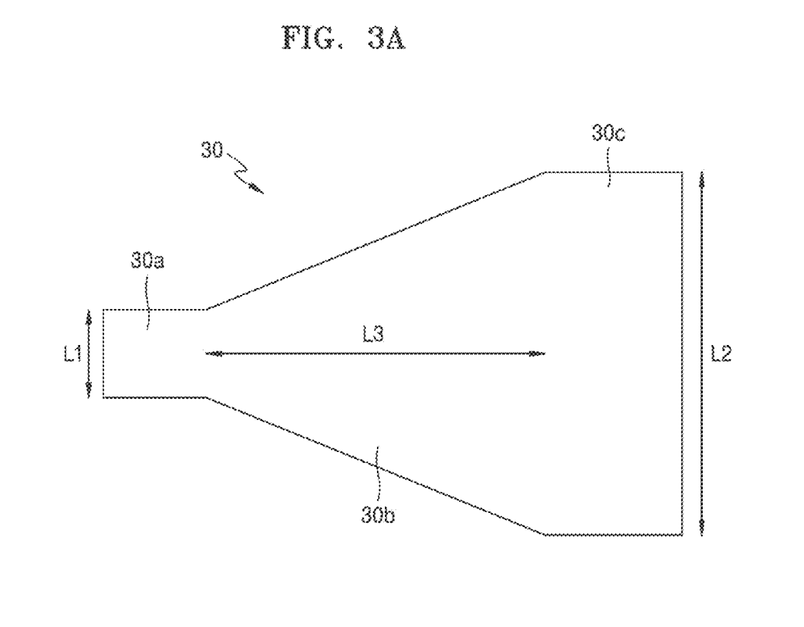
FIGS. 3A and 3B are plan views of a mode converter in an optical interconnection device and an integrated optical device, according to an embodiment of the inventive concept.
Figure 3B:
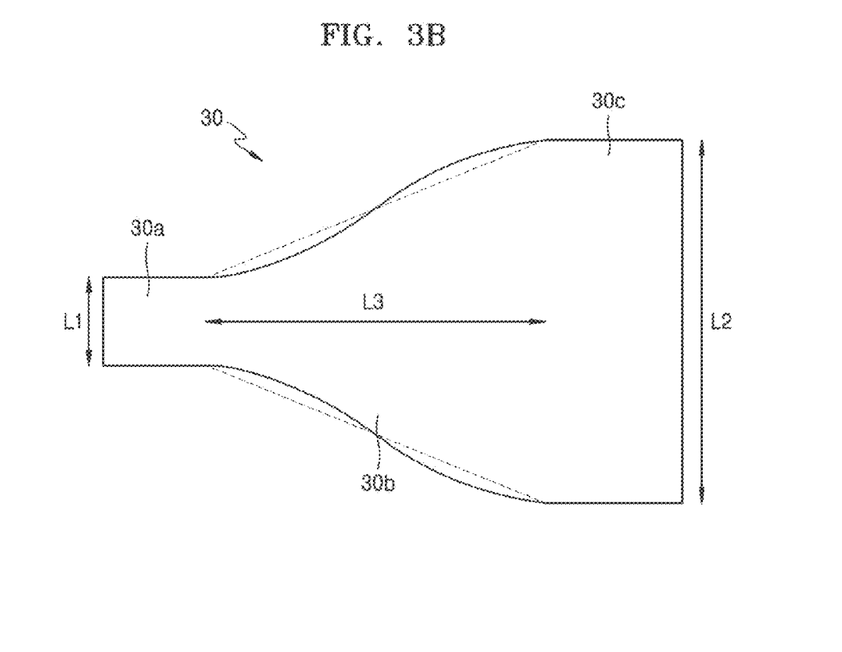

FIG. 1 is a schematic perspective view of a part of an optical interconnection device and an integrated optical device, and FIG. 2 is a schematic view of a route through which light is guided in the optical interconnection device and the integrated optical device, according to an embodiment of the inventive concept. FIGS. 3A and 3B are plan views of a mode converter in the optical interconnection device and the integrated optical device, according to an embodiment of the inventive concept.

Referring to FIGS. 1 to 3B, the optical interconnection device according to an embodiment of the inventive concept may be an optical coupler, and may include a first element layer 20 formed on a substrate 10, a second element layer 40 disposed on the first element layer 20 and receiving an optical signal, and a mode converter 30 to eliminate a difference between an effective refractive index of the first element layer 20 and an effective refractive index of the second element layer 40 and to match a mode profile.

The first element layer 20 may form an active optical element. For example, the first element layer 20 may be formed of a modulator and may include a doping area 15 to contact with an electrode (not shown). The doping area 15 may be a p-type or n-type doping area and may extend from at least some of the first element layer 20 to an upper portion of the substrate 10. The second element layer 40 may form a passive optical element.

The first element layer 20, the mode converter 30, and the second element layer 40 may be sequentially disposed on respective planes on the substrate 10, in which the planes are spaced apart from one another. For example, the first element layer 20 may be arranged to be spaced apart from the mode converter 30 with a first gap H1 therebetween, and the mode converter 30 may be arranged to be spaced apart from the second element layer 40 with a second gap H2 therebetween. The first gap H1 may be different from the second gap H2. For example, the first gap H1 may be less than the second gap H2. However, the inventive concept is not limited thereto. The first gap H1 may be approximately the same as the second gap H2.

Spaces between the substrate 10, the first element layer 20, the second element layer 40, and the mode converter 30 may be filled with at least one insulating layer, and furthermore, the first element layer 20, the second element layer 40, and the mode converter 30 may be buried in the insulating layer. A main difference between the first element layer 20 and the second element layer 40 is as follows. Four sides of the second element layer 40 may be embedded in the insulating layer while a lower portion of the first element layer 20 directly contacts a substrate such as silicon (Si) and a material forming the substrate functions as an undercladding.

One end 30a of the mode converter 30 may overlap a part of the second element layer 40 at a predetermined section W1 (for example, 17 μm), and the other end 30c of the mode converter 30 may overlap a part of the first element layer 20 at a predetermined section W2 (for example, 8 μm). The "overlap" indicates that each end of the mode converter 30 and the first or second element layer 20 or 40 have an overlapping region when light is vertically projected.

A width L1 of the one end 30a of the mode converter 30 may be different from a width L2 of the other end 30c of the mode converter 30. For example, the width L1 of the one end 30a of the mode converter 30 may be less than the width L2 of the other end 30c of the mode converter 30.

The mode converter 30 may further include a tapered region 30b connecting the ends 30a and 30c to each other. The tapered region 30b indicates a region changing its width as the mode converter 30 extends in a length direction L3. The change in a width of the tapered region 30b may have a constant rate of change linearly (see FIG. 3A), or may have a curve due to incremental changes in a curved width rate of change (see FIG. 3B).

FIGS. 1 and 2 illustrate an example of a mode converter pair that are symmetrically arranged to be spaced apart from each other with a predetermined gap A, but the inventive concept is not limited thereto. Depending on an embodiment, a mode converter on a route, the route through which light is propagated from the first element layer 20 to the second element layer 40, may be omitted.

The substrate 10 may be a bulk substrate including a material having a first refractive index, and the first element layer 20 may include a material having a second refractive index, the mode converter 30 may include a material having a third refractive index, and the second element layer 40 may include a material having a fourth refractive index, wherein the first effective refractive index of the first element layer 20 in a waveguide mode may be approximately the same as an effective refractive index of the end 30c of the converter 30 in a waveguide mode, and the second effective refractive index of the second element layer 40 in a waveguide mode may be approximately the same as an effective refractive index of the one end 30a of the converter 30 in a waveguide mode. The first effective refractive index may be greater than the first refractive index and less than the second refractive index, and the second effective refractive index may be less than the third and fourth refractive indexes.

As another example, the first refractive index may be the same as the fourth refractive index, and the second refractive index may be the same as the third refractive index. Here, a material having the first refractive index may be Si, a material having the second refractive index may be germanium (Ge) or silicon germanium (SiGe), a material having the third refractive index may be Ge, SiGe, or Si, and a material having the fourth refractive index may be Si, silicon oxide (SiOx), silicon nitride (SiNx), silicon oxynitride (SiON), or a combination thereof.

Effective refractive indexes of both optical waveguides need to be identical for directional coupling. Meanwhile, the mode converter 30 is required for light propagation while a fundamental mode is maintained since light needs to be propagated in a fundamental single-mode because there may be an error in a signal when light is propagated in a multi-mode. As another example, an effective refractive index of the first element layer 20 formed of Ge is about 3.54 and an effective refractive index of a bus waveguide (for example, the second element layer 40) receiving an optical signal is about 2.57. Therefore, a structure of the mode converter 30 including the tapered region 30b may be used to overcome a difference between the effective refractive indexes.

The optical interconnection device described above according to an embodiment of the inventive concept may be referred to as an optical coupler, and a coupling structure of a vertical mode may extend to an integrated optical device having a network-integration structure of optical elements, the integrated optical device connecting and integrating a passive optical element and/or an active optical element disposed in different layers.

Accordingly, the integrated optical device according to an embodiment of the inventive concept may include the bulk-Si substrate 10, the first element layer 20 formed on the bulk-Si substrate 10 and configuring an active optical element, the second element layer 40 disposed on the active layer and receiving an optical signal, and the mode converter 30 interposed between the first element layer 20 and the second element layer 40 and eliminating a difference between an effective refractive index of the first element layer 20 and an effective refractive index of the second element layer 40 and matching a mode profile. The first element layer 20, the mode converter 30, and the second element layer 40 may be sequentially disposed on respective planes on the substrate 10, in which the one end 30a of the mode converter 30 may overlap a part of the second element layer 40, and the other end 30c of the mode converter 30 may overlap a part of the first element layer 20.

According to expanded embodiments of the inventive concept, the substrate 10 may include a material having a first refractive index and is a bulk-Si substrate but not an SOI substrate, and the first element layer 20 may include a material having the second refractive index that is greater than the first refractive index. Therefore, the expanded embodiments may include expanded devices, for example, a passive optical element implemented through a waveguide structure confining an optical signal of the first element layer 20, and active optical elements such as an optical modulator, a photodetector, or a light-emitting element that are designed based on an optical mode of the waveguide structure.

In other words, according to expanded embodiments of the inventive concept, an active optical element may include the bulk substrate 10, which is different from an SOI substrate, including a material having the first refractive index, and the first element layer 20, which is formed on the bulk substrate 10, including a material having the second refractive index that is greater than the first refractive index and implementing a waveguide structure confining an optical signal. The active optical element may be designed based on an optical mode of the waveguide structure. For example, the active optical element may include an optical modulator, a photodetector or a light-emitting element.

Hereinafter, a Ge modulator device will be explained as a specific example of the integrated optical device of the inventive concept described above for the understanding of the inventive concept.

Ge is useful when manufacturing an optical element in a near-infrared region for optical interconnection with a band gap of 0.67 eV. For example, a Ge electroabsorption optical modulator may transmit a signal by switching light in a Ge waveguide with an electric field. In the optical interconnection device and the integrated optical device, the first element layer 20 and the mode converter 30 may include Ge (refractive index: 4.275), and the substrate 10 and the second element layer 40 may include Si (refractive index: 3.475).

Figure 4:
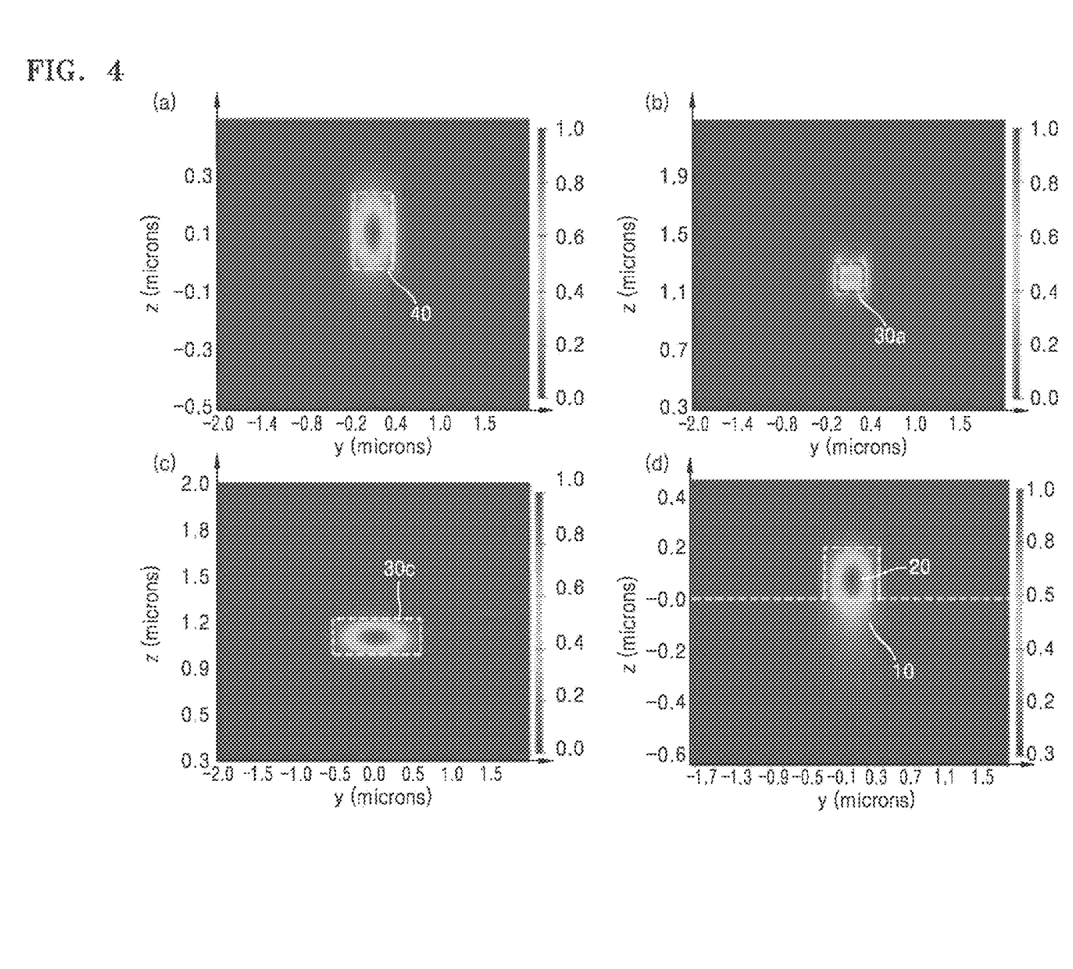
FIG. 4 is views of a mode profile corresponding to various components in an optical interconnection device and an integrated optical device, according to an embodiment of the inventive concept.

In more detail, FIG. 4(a) shows a fundamental mode profile of the second element layer 40 that is a bus waveguide including amorphous silicon, wherein an effective refractive index (neff) is 2.57 in a bus waveguide having lateral sides (widths) of 0.5 μm and longitudinal sides (heights) of 0.26 μm. FIG. 4(b) shows a mode profile of the mode converter 30 directly coupled to the fundamental mode profile of the second element layer 40, the fundamental mode profile of the second element layer 40 and the mode profile of the mode converter 30 having lateral sides (widths) of 0.3 μm and longitudinal sides (heights) of 0.2 μm and an effective refractive index (neff) of 2.57, respectively.

FIG. 4(c) shows a mode profile of the other end 30c of the mode converter 30 directly coupled to the first element layer 20 formed of Ge, the mode profile of the other end 30c of the mode converter 30 having lateral sides (widths) of 1.5 μm and longitudinal sides (heights) of 0.2 μm and an effective refractive index (neff) of 3.54.

FIG. 4(d) shows a fundamental mode profile propagated to the first element layer 20 formed of Ge as light of the other end 30c is directly coupled to the first element layer 20. A waveguide of the first element layer 20 formed of Ge has lateral sides (widths) of 0.57 μm and longitudinal sides (heights) of 0.2 μm and an effective refractive index (neff) of 3.54.

Figure 5:
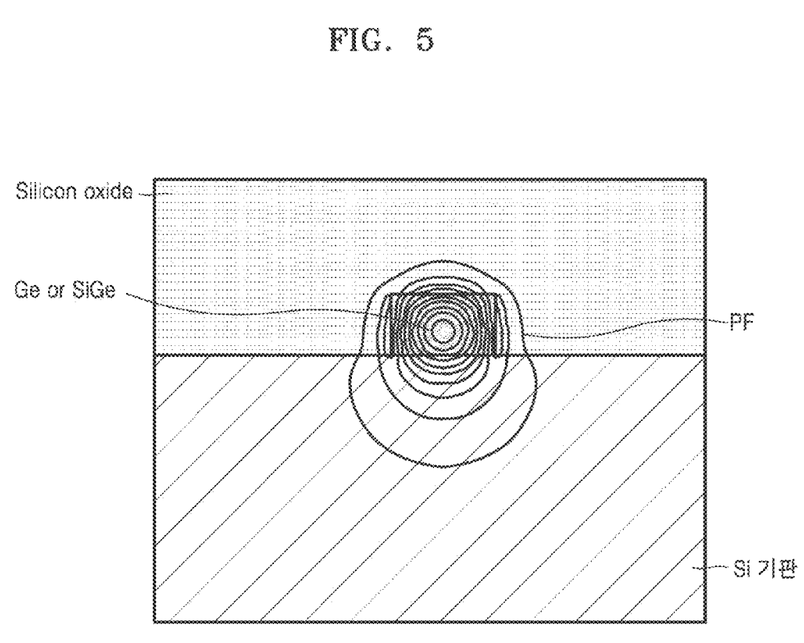
FIG. 5 is a view illustrating a simulation result of an electromagnetic wave in an optical interconnection device and an integrated optical device, according to an embodiment of the inventive concept.

The point of the inventive concept using the above is that a Ge waveguide is formed on the bulk-Si substrate 10 but not an SOI substrate. Most existing Ge-on-Si optical elements are formed by using a Ge thin-film material which is epitaxially grown on an upper silicon layer of an SOI substrate, and one of the main reasons using an SOI substrate is that an SOI buried-oxide layer helps to confine a propagated profile of an optical mode in Ge. The point of the inventive concept, as illustrated in FIG. 5, is using a normal silicon wafer but not an SOI wafer, and designing a Ge optical element to confine a profile of an optical mode (a mode having a profile in a contour line shape like PF of FIG. 5) by using a refractive index difference between Ge and Si.

Another point of the inventive concept is using a directional coupler utilizing interference of an evanescent wave tail between waveguides of FIG. 1. Many existing Ge-on-Si optical elements using an SOI substrate may use a Butt coupler when connecting a passive waveguide element and an active element having different effective refractive indexes. However, the Butt coupler may have a lot of limitations on process and a strict allowable tolerance to be used, and may have large back-reflection in a connecting interface of a passive element and an active element.

The point of the inventive concept is successfully transmitting an input signal of a fundamental mode to a first element layer while a change in mode is minimized, simplifying designs of elements to reduce a process tolerance, and designing an integrated circuit to use a multilayer but not a surface layer for signal transmission to minimize the integrated circuit.

Figure 6:
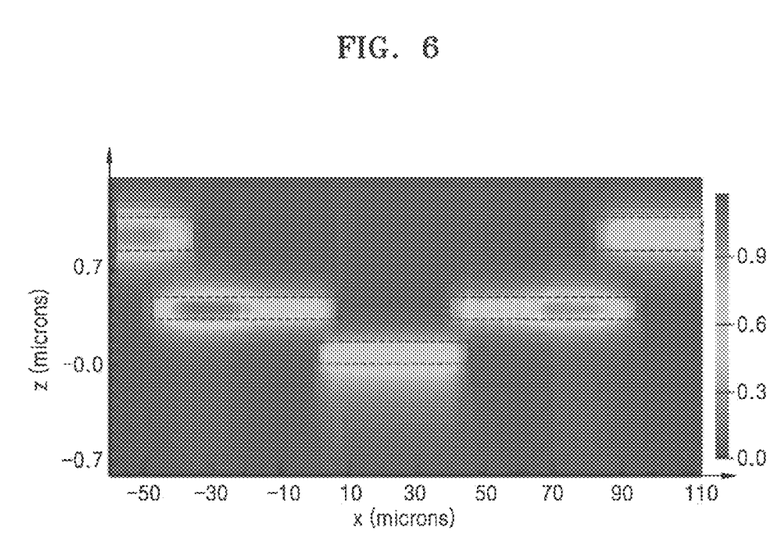
FIG. 6 is a view illustrating a result of light propagation of an optical interconnection device and an integrated optical device, according to an embodiment of the inventive concept.

FIG. 6 is a view illustrating a result of light propagation of an optical interconnection device and an integrated optical device, according to an embodiment of the inventive concept. FIG. 6 shows a simulation result of a signal of a fundamental mode transmitted from FIG. 4(a), the signal transmitted to a top second element layer after passing through a first element layer and a mode converter, sequentially. Referring to FIG. 6, it can be seen that light is propagated to various element layers after being stably confined in an optical waveguide while an optical loss is minimized.

Referring to FIGS. 1 and 2, the optical interconnection device and the integrated optical device according to an embodiment of the inventive concept may design a vertical mode coupler and may change an effective refractive index to couple an optical mode of an input bus waveguide, for example, the second element layer 40 with an optical mode confined in a Ge waveguide on a bulk-Si substrate, for example, the first element layer 20.

For example, the mode converter 30 may be designed and used to eliminate a difference between an effective refractive index of the Ge waveguide and an effective refractive index of the input bus waveguide, and to match a mode profile. Light from a bus waveguide having an effective refractive index of 2.4 may be coupled to the narrow end 30a of the mode converter 30. An effective refractive index of the mode converter 30 having the coupled light may be matched with an effective refractive index of the Ge waveguide in the other end 30c while passing through the tapered region 30b, and thus, light may be transmitted to element layers.

Such a vertical-mode coupling structure and a method of optical coupling may help to design a network integration structure of optical elements connecting and integrating the second element layer 40, which is an optical waveguide, with the first element layer 20, which is a Ge active optical element that are in different layers. A light L from the second element layer 40 may be smoothly propagated to element layers through the mode converter 30 by eliminating a difference between an effective refractive index of the second element layer 40 and an effective refractive index of the first element layer 20. Next, the light of the mode converter 30 may be entered into the first element layer 20 and optical elements designed in the first element layer 20 may function at least one predetermined roles (for example, function as an on/off switch of a modulator formed in the first element layer 20, a photodetector formed in the first element layer 20, or a Ge laser formed in the first element layer 20).

Si photonics, which is a representative technique for implementing optical interconnection, is easy to commercially access by using the same process as that used in an existing semiconductor chip. However, current silicon photonics, which is a technique based on an SOI wafer, is difficult to directly transplant to an actual general CMOS chip. Furthermore, current semiconductor chip techniques require a small area for an ultra-high density integrated circuit, and thus, existing integration structures forming a passive optical element and an active optical element based on an SOI wafer at the height level of an identical surface layer may conflict with a trend of a current semiconductor device having a high integration degree as an area occupied by the passive optical element and the active optical element is quite greater.

The inventive concept developed to improve the problems may directly progress a process on a bulk-Si wafer but not an existing SOI wafer, may improve compatibility for integration of a photonics element and a Si-electron circuit by being designed as a vertical coupler for high-density integration, and may increase the degree of element integration. Furthermore, low manufacturing costs may be expected as a process is simplified by minimizing elements.

According to the embodiments of the inventive concept described above, an optical interconnection device and an integrated optical device based on a low-cost bulk-Si substrate may be provided. However, this is merely an example, and embodiments of the disclosure are not limited thereto.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An optical interconnection device comprising:
a first element layer formed on a substrate;
a second element layer disposed on the first element layer and receiving an optical signal; and
a mode converter interposed between the first element layer and the second element layer, and eliminating a difference between an effective refractive index of the first element layer and an effective refractive index of the second element layer and match a mode profile,
wherein the first element layer, the mode converter, and the second element layer are sequentially disposed on respective planes spaced apart from each other on the substrate,
wherein a first end of the mode converter overlaps a part of the second element layer along a direction parallel to a top surface of the substrate, and a second end of the mode converter, which is opposite to the first end of the mode converter, overlaps a part of the first element layer along the direction,
wherein the substrate is a bulk substrate comprising a material having a first refractive index, and the first element layer comprises a material having a second refractive index, the mode converter comprises a material having a third refractive index, and the second element layer comprises a material having a fourth refractive index,
wherein a first effective refractive index of the first element layer in a waveguide mode is approximately same as an effective refractive index of the second end of the mode converter in a waveguide mode, and a second effective refractive index of the second element layer in a waveguide mode is approximately same as an effective refractive index of the first end of the mode converter in a waveguide mode, and
wherein the first effective refractive index is greater than the first refractive index and less than the second refractive index, and the second effective refractive index is less than the third and fourth refractive indexes.

2. The optical interconnection device of claim 1, wherein a material having the first refractive index is silicon (Si),
wherein a material having the second refractive index is germanium (Ge) or silicon germanium (SiGe),
wherein a material having the third refractive index is Ge, SiGe, or Si, and
wherein a material having the fourth refractive index is Si, silicon oxide (SiOx), silicon nitride (SiNx), silicon oxynitride (SiON), or a combination thereof.

3. The optical interconnection device of claim 1, wherein a width of the first end of the mode converter is different from a width of the second end of the mode converter.

4. The optical interconnection device of claim 3, wherein the width of the first end of the mode converter is less than the width of the second end of the mode converter.

5. The optical interconnection device of claim 1, wherein the mode converter further comprises a tapered region connecting the first end with the second end.

6. The optical interconnection device of claim 1, wherein the first element layer is vertically spaced apart from the second end of the mode converter by a first distance,
wherein the second element layer is vertically spaced apart from the first end of the mode converter by a second distance, and
wherein the second distance is different from the first distance.

7. The optical interconnection device of claim 6, wherein the second distance is greater than the first distance.

8. The optical interconnection device of claim 1, the optical interconnection device further comprising:
an insulating layer filling spaces between the substrate, the first element layer, the second element layer, and the mode converter.

9. An optical device comprising:
a first element layer formed on a substrate;
a second element layer disposed on the first element layer and receiving an optical signal; and
a mode converter interposed between the first element layer and the second element layer, and eliminating a difference between an effective refractive index of the first element layer and an effective refractive index of the second element layer and match a mode profile,
wherein the first element layer, the mode converter, and the second element layer are sequentially disposed on respective planes spaced apart from each other on the substrate,
wherein a first end of the mode converter overlaps a part of the second element layer along a direction parallel to a top surface of the substrate, and a second end of the mode converter, which is opposite to the first end of the mode converter, overlaps a part of the first element layer along the direction, and
wherein a width of the first end of the mode converter is different from a width of the second end of the mode converter.

10. The optical device of claim 9, wherein the width of the first end of the mode converter is less than the width of the second end of the mode converter.

11. An optical device comprising:
a first element layer formed on a substrate;
a second element layer disposed on the first element layer and receiving an optical signal; and
a mode converter interposed between the first element layer and the second element layer, and eliminating a difference between an effective refractive index of the first element layer and an effective refractive index of the second element layer and match a mode profile, wherein the first element layer, the mode converter, and the second element layer are sequentially disposed on respective planes spaced apart from each other on the substrate, wherein a first end of the mode converter overlaps a part of the second element layer along a direction parallel to a top surface of the substrate, and a second end of the mode converter, which is opposite to the first end of the mode converter, overlaps a part of the first element layer along the direction, wherein the first element layer is vertically spaced apart from the second end of the mode converter by a first distance, wherein the second element layer is vertically spaced apart from the first end of the mode converter by a second distance, and wherein the second distance is different from the first distance.

12. The optical device of claim 11, wherein the second distance is greater than the first distance.

* * * * *